US012696202B2

(12) United States Patent
Nadakuduti et al.

(10) Patent No.: US 12,696,202 B2
(45) Date of Patent: Jul. 28, 2026

(54) RADIO FREQUENCY EXPOSURE EVALUATION PER SURFACE

(71) Applicant: QUALCOMM Incorporated, San Diego, CA (US)

(72) Inventors: Jagadish Nadakuduti, Bermuda Dunes, CA (US); Lin Lu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 357 days.

(21) Appl. No.: 18/472,070

(22) Filed: Sep. 21, 2023

(65) Prior Publication Data

US 2024/0114469 A1     Apr. 4, 2024

Related U.S. Application Data

(60) Provisional application No. 63/376,964, filed on Sep. 23, 2022.

(51) Int. Cl.
H04W 52/36        (2009.01)

(52) U.S. Cl.
CPC .............................. H04W 52/367 (2013.01)

(58) Field of Classification Search
CPC .. H04W 52/367; H04W 52/38; H04B 1/3838; H04B 7/0408
See application file for complete search history.

(56) References Cited

U.S. PATENT DOCUMENTS

| | | | | |
|---|---|---|---|---|
| 2013/0210477 A1* | 8/2013 | Peter | .................... | H04B 1/3838 |
| | | | | 455/73 |
| 2014/0307570 A1* | 10/2014 | Hong | ................... | H04B 1/3838 |
| | | | | 370/252 |
| 2017/0192478 A1* | 7/2017 | Mercer | ................. | G01D 5/142 |
| 2020/0177223 A1* | 6/2020 | Fernando | ............ | H04B 1/3838 |
| 2022/0070796 A1 | 3/2022 | Nadakuduti et al. | | |
| 2023/0328663 A1* | 10/2023 | Va | ........................ | H04W 52/223 |
| | | | | 370/318 |
| 2024/0015669 A1* | 1/2024 | Strauch | ............... | H04W 52/223 |

FOREIGN PATENT DOCUMENTS

| | | | |
|---|---|---|---|
| EP | 3567940 A1 | 11/2019 | |

OTHER PUBLICATIONS

International Search Report and Written Opinion—PCT/US2023/074846—ISA/EPO—Jan. 22, 2024.

* cited by examiner

*Primary Examiner* — Fayyaz Alam

(74) *Attorney, Agent, or Firm* — Patterson & Sheridan LLP/ Qualcomm

(57)        ABSTRACT

Certain aspects of the present disclosure provide techniques and apparatus for radio frequency exposure evaluation per surface. A method of wireless communication by a wireless device includes accessing radio frequency (RF) exposure information associated with different surfaces among a plurality of surfaces of the wireless device; and transmitting a signal at a transmit power determined based at least in part on the RF exposure information and an RF exposure limit.

30 Claims, 9 Drawing Sheets

| Tech/Band | Antenna | Head Exposure Scenario | | | | Body-Worn Exposure Scenario | | | | | | |
| | | Plimit (dBm) | Normalized SAR ratios | | Plimit (dBm) | Normalized SAR ratios | | | | | |
| | | | Left | Right | | Front | Back | Left | Right | Top | Bottom |
| CDMA Band1 | 0 | 26 | 1.0 | 0.8 | 19 | 0.8 | 1.0 | 0.4 | 0.4 | 0.4 | 0.4 |
| CDMA Band1 | 1 | 19 | 0.6 | 1.0 | 18.7 | 1.0 | 0.9 | 0.4 | 0.4 | 0.4 | 0.4 |

FIG. 6

| Antenna Module | Front | Back | Left | Right | Top | Bottom |
|---|---|---|---|---|---|---|
| 0 | 1.0 | 0.56 | 1.0 | 0.11 | 0.78 | 0.01 |
| 1 | 0.42 | 1.0 | 0.11 | 1.0 | 0.62 | 0.01 |
| 2 | 0.78 | 1.0 | 0.23 | 1.0 | 0.01 | 0.89 |
| 3 | 1.0 | 0.42 | 1.0 | 0.19 | 0.01 | 0.91 |

FIG. 7A

| Beam | Plimit (dBm) | Front | Back | Left | Right | Top | Bottom |
|---|---|---|---|---|---|---|---|
| 0 | 8 | 1 | 0.3 | 0.2 | 0.42 | 0.56 | 0.76 |
| 1 | 8 | 0.52 | 1 | 0.19 | 0.01 | 0.34 | 0.56 |
| 2 | 8 | 0.23 | 0.47 | 1 | 0.15 | 0.48 | 0.78 |

Access radio frequency (RF) exposure information associated with different surfaces among a plurality of surfaces of the wireless device

804

Transmit a signal at a transmit power determined based at least in part on the RF exposure information and an RF exposure limit

RADIO FREQUENCY EXPOSURE EVALUATION PER SURFACE

CROSS-REFERENCE TO RELATED APPLICATION

This application claims the benefit of U.S. Application Ser. No. 63/376,964 filed Sep. 23, 2022 and hereby incorporated by reference in its entirety for all purposes.

INTRODUCTION

Field of the Disclosure

Aspects of the present disclosure relate to wireless communications, and more particularly, to radio frequency (RF) exposure compliance.

Description of Related Art

Wireless communication systems are widely deployed to provide various telecommunication services such as telephony, video, data, messaging, broadcasts, etc. Modern wireless devices (such as cellular telephones) are generally mandated to meet radio frequency (RF) exposure limits set by certain governments and international standards and regulations. To ensure compliance with the standards, such devices must currently undergo an extensive certification process prior to being shipped to market. To ensure that a wireless device complies with an RF exposure limit, techniques have been developed to enable the wireless device to assess RF exposure from the wireless device and adjust the transmission power of the wireless device accordingly to comply with the RF exposure limit.

SUMMARY

The systems, methods, and devices of the disclosure each have several aspects, no single one of which is solely responsible for its desirable attributes. Without limiting the scope of this disclosure as expressed by the claims that follow, some features will now be discussed briefly. After considering this discussion, and particularly after reading the section entitled "Detailed Description," one will understand how the features of this disclosure provide advantages that include improved wireless communication performance.

Certain aspects of the subject matter described in this disclosure can be implemented in a method for wireless communication by a wireless device. The method generally includes accessing radio frequency (RF) exposure information associated with different surfaces among a plurality of surfaces of the wireless device. The method also includes transmitting a signal at a transmit power determined based at least in part on the RF exposure information and an RF exposure limit.

Certain aspects of the subject matter described in this disclosure can be implemented in an apparatus for wireless communication. The apparatus generally includes one or more memories collectively storing computer-executable instructions. The apparatus also includes one or more processors coupled to the one or more memories. The one or more processors are collectively configured to execute the computer-executable instructions to cause the apparatus to perform an operation. The operation includes accessing radio frequency (RF) exposure information associated with different surfaces among a plurality of surfaces of the apparatus. The operation also includes transmitting a signal at a transmit power determined based at least in part on the RF exposure information and an RF exposure limit.

Certain aspects of the subject matter described in this disclosure can be implemented in an apparatus for wireless communication. The apparatus generally includes means for means for accessing radio frequency (RF) exposure information associated with different surfaces among a plurality of surfaces of the apparatus. The apparatus also includes means for transmitting a signal at a transmit power determined based at least in part on the RF exposure information and an RF exposure limit.

Certain aspects of the subject matter described in this disclosure can be implemented in a non-transitory computer-readable medium. The non-transitory computer-readable medium has instructions stored thereon for accessing radio frequency (RF) exposure information associated with different surfaces among a plurality of surfaces of a wireless device; and transmitting a signal at a transmit power determined based at least in part on the RF exposure information and an RF exposure limit.

Other aspects provide: an apparatus operable, configured, or otherwise adapted to perform any one or more of the aforementioned methods and/or those described elsewhere herein; a non-transitory, computer-readable medium comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and/or an apparatus comprising means for performing the aforementioned methods as well as those described elsewhere herein. By way of example, an apparatus may comprise a processing system, a device with a processing system, or processing systems cooperating over one or more networks.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIG. 6 illustrates an example table of normalized specific absorption rate ratios for specific surfaces and/or positions.

FIG. 7A illustrates an example table of normalized power density ratios for specific surfaces per antenna array.

FIG. 7B illustrates an example table of normalized power density ratios for specific surfaces per beam.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
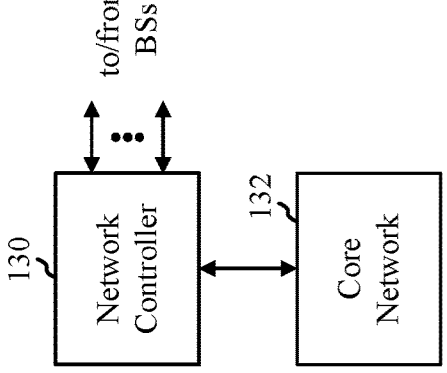
FIG. 1 is a block diagram conceptually illustrating an example wireless communication network.

Aspects of the present disclosure provide apparatus, methods, processing systems, and computer-readable mediums for radio frequency (RF) exposure evaluation per surface of a wireless device.

In certain cases, a wireless communications device may evaluate RF exposure compliance using a time-averaged operation. The wireless device may perform the RF exposure assessment of past RF exposure over a given time window to determine a maximum allowable transmit power for a future time interval in the time window. The time-averaged operation may track a normalized RF exposure history (e.g., a transmit power divided by a maximum time-averaged transmit power limit) over the time window for each radio, and the wireless device may sum the normalized RF exposures of all active radios in simultaneous transmission scenarios.

In some cases, the sum of normalized RF exposure associated with the radios may use the worst exposure for a particular surface associated with each of the radios. The time-averaged operation assumes that radios in simultaneous transmission scenarios have the worst-case exposure on the same surface even when the worst-case exposure for one radio may occur on a different surface than another radio. For example, a radio may exhibit its worst exposure (e.g., highest exposure) on a top surface of the wireless device (for example, where the radio is arranged), and another radio may exhibit its worst exposure on a left surface of the wireless device (for example, where the other radio is arranged). The time-averaged operation may use the worst-case exposure for each of the radios regardless of the surface where the exposure occurs. In a body-worn exposure scenario (e.g., when a mobile phone is stored in a shirt pocket or pant pocket), the RF exposure may occur from the front, back, left, right, top, and/or bottom surfaces of the wireless device. Different radio access technologies, bands, antennas (or antenna arrays), and exposure scenarios (e.g., head, body, extremity, or hotspot scenarios) may have the worst-case exposure on different surfaces.

Aspects of the present disclosure provide apparatus and methods for evaluating RF exposure per surface of a wireless device. The total time-averaged RF exposure of multiple radios may be evaluated per exposure surface of the wireless device. For time-averaged RF exposure compliance, the wireless device may track historical RF exposure from multiple radios per surface of the wireless device. The wireless device may determine the maximum allowable transmit power for a future time interval based on the RF exposure evaluated per surface. For example, the wireless device may select the smallest value for the transmit power among the values determined for each surface.

The apparatus and methods for evaluating RF exposure per surface described herein may facilitate improved wireless communication performance (e.g., improved signal quality at the receiver, lower latencies, higher throughput, etc.). For example, the RF exposure evaluation per surface may provide an accurate assessment of the RF exposure occurring at particular surfaces across the wireless device allowing the wireless device to assign more exposure margin to certain transmissions.

As used herein, a radio may refer to one or more active bands, transceivers, and/or radio access technologies (RATs) (e.g., code division multiple access (CDMA), Long Term Evolution (LTE), New Radio (NR), IEEE 802.11, Bluetooth, satellite, Near Field Communications (NFC), peer-to-peer (P2P), vehicle-to-everything (V2X), etc.) used for wireless communications. For example, for uplink carrier aggregation in LTE and/or NR, each of the active component carriers used for wireless communications may be treated as a separate radio. Similarly, multi-band transmissions for IEEE 802.11 communications may be treated as separate radios for each band (e.g., 2.4 GHz, 5 GHz, or 6 GHz).

The following description provides examples of RF exposure compliance in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs, or may support multiple RATs.

The techniques described herein may be used for various wireless networks and radio technologies. While aspects may be described herein using terminology commonly associated with 3G, 4G, and/or new radio (e.g., 5G NR) wireless technologies, aspects of the present disclosure can be applied in other generation-based communication systems and/or to wireless technologies such as 802.11, 802.15, etc.

NR access may support various wireless communication services, such as enhanced mobile broadband (eMBB) targeting wide bandwidth (e.g., 80 MHz or beyond), millimeter wave (mmWave) targeting high carrier frequency (e.g., 24 GHz to 53 GHz or beyond), massive machine-type communication (mMTC) targeting non-backward-compatible machine-type communication (MTC) techniques, and/or mission critical targeting ultra-reliable low-latency communications (URLLC). These services may include latency and reliability requirements. These services may also have different transmission time intervals (TTIs) to meet respective quality of service (QoS) requirements. In addition, these services may co-exist in the same subframe. NR supports beamforming, and beam direction may be dynamically configured. Multiple-input, multiple-output (MIMO) transmissions with precoding may also be supported, as may multi-layer transmissions. Aggregation of multiple cells may be supported.

Example Wireless Communication Network and Devices

FIG. 1 illustrates an example wireless communication network 100 in which aspects of the present disclosure may be performed. For example, the wireless communication network 100 may be an NR system (e.g., a 5G NR network), an Evolved Universal Terrestrial Radio Access (E-UTRA) system (e.g., a 4G network), a Universal Mobile Telecommunications System (UMTS) (e.g., a 2G/3G network), or a code division multiple access (CDMA) system (e.g., a 2G/3G network), or may be configured for communications according to an IEEE standard such as one or more of the 802.11 standards, etc. As shown in FIG. 1, the UE 120a includes a RF exposure manager 122 that ensures RF exposure compliance using RF exposure evaluations per surface among multiple surfaces of the UE 120a, in accordance with aspects of the present disclosure.

As illustrated in FIG. 1, the wireless communication network 100 may include a number of BSs 110a-z (each also individually referred to herein as BS 110 or collectively as BSs 110) and other network entities. A BS 110 may provide communication coverage for a particular geographic area, sometimes referred to as a "cell," which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b, and 110c may be macro BSs for the macro cells 102a, 102b, and 102c, respectively. The BS 110x may be a pico BS for a pico cell 102x. The BSs 110y and 110z may be femto BSs for the femto cells 102y and 102z, respectively. A BS may support one or multiple cells.

The BSs 110 communicate with UEs 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile. Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may be in communication with a set of BSs 110 and provide coordination and control for these BSs 110 (e.g., via a backhaul). In certain cases, the network controller 130 may include a centralized unit (CU) and/or a distributed unit (DU), for example, in a 5G NR system. In aspects, the network controller 130 may be in communication with a core network 132 (e.g., a 5G Core Network (5GC)), which provides various network functions such as Access and Mobility Management, Session Management, User Plane Function, Policy Control Function, Authentication Server Function, Unified Data Management, Application Function, Network Exposure Function, Network Repository Function, Network Slice Selection Function, etc.

The term "beam" may be used in the present disclosure in various contexts. Beam may be used to mean a set of gains and/or phases (e.g., pre-coding weights or co-phasing weights) applied to antenna elements in the UE and/or BS for transmission or reception. The term "beam" may also refer to an antenna or radiation pattern of a signal transmitted while applying the gains and/or phases to the antenna elements. Other references to beam may include one or more properties or parameters associated with the antenna (radiation) pattern, such as angle of arrival (AoA), angle of departure (AoD), gain, phase, directivity, beam width, beam direction (with respect to a plane of reference) in terms of azimuth and elevation, peak-to-side-lobe ratio, or an antenna port associated with the antenna (radiation) pattern. The term "beam" may also refer to an associated number and/or configuration of antenna elements (e.g., a uniform linear array, a uniform rectangular array, or other uniform array).

Figure 2:
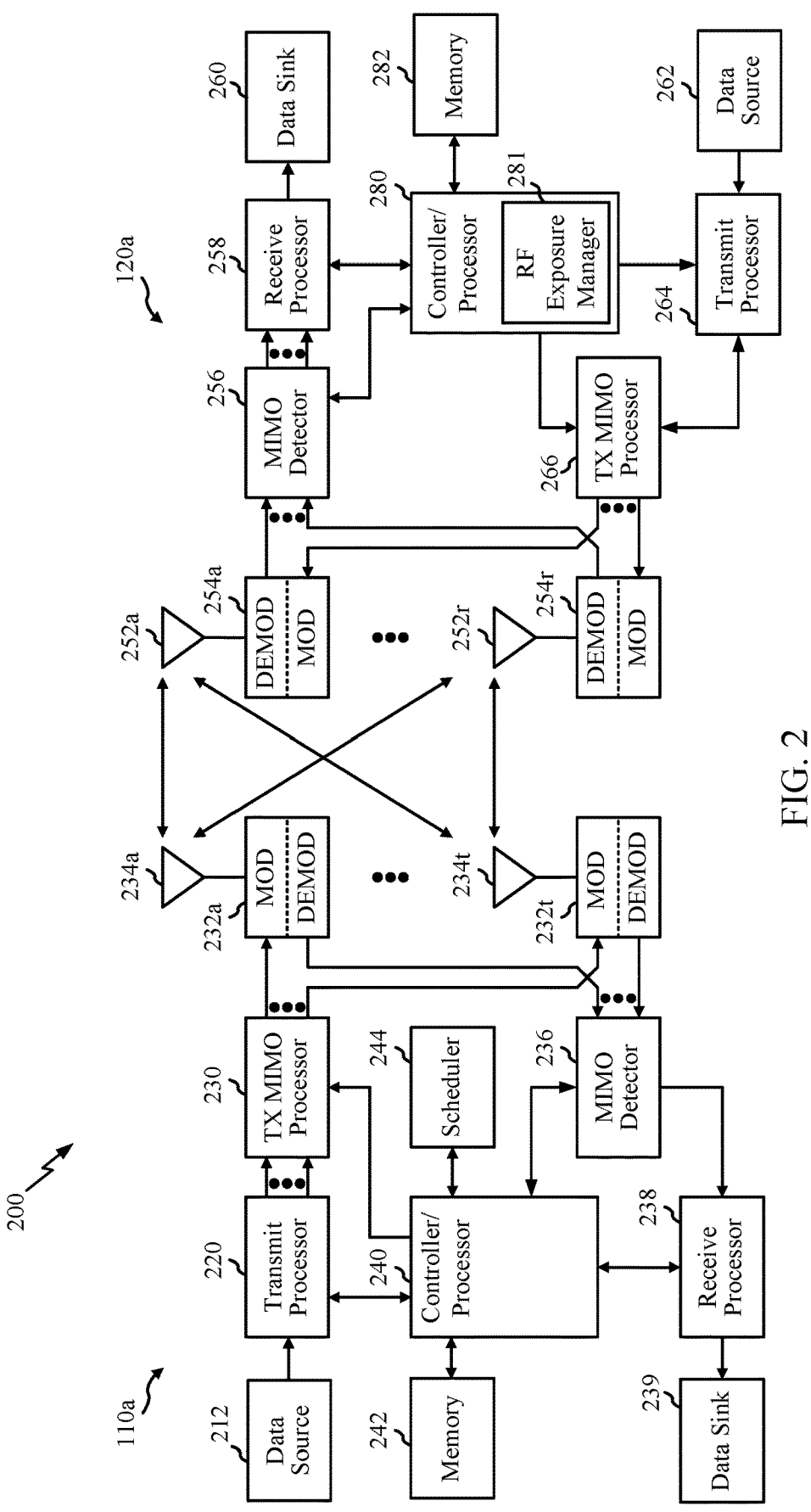
FIG. 2 is a block diagram conceptually illustrating a design of an example a base station (BS) and user equipment (UE).

FIG. 2 illustrates example components of BS 110a and UE 120a (e.g., the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid automatic repeat request (HARQ) indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a PDSCH, a physical uplink shared channel (PUSCH), or a physical sidelink shared channel (PSSCH).

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), PBCH demodulation reference signal (DMRS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for orthogonal frequency division multiplexing (OFDM), etc.) to obtain an output sample stream. Each of the transceivers 232a-232t may further process (e.g., convert to analog, amplify, filter, and upconvert) the output sample stream to obtain a downlink signal. Downlink signals from the transceivers 232a-232t may be transmitted via the antennas 234a-234t, respectively.

At the UE 120a, the antennas 252a-252r may receive the downlink signals from the BS 110a and may provide received signals to the transceivers 254a-254r, respectively. The transceivers 254a-254r may condition (e.g., filter, amplify, downconvert, and digitize) a respective received signal to obtain input samples. Each demodulator (DEMOD) in the transceivers 232a-232t may further process the input samples (e.g., for OFDM, etc.) to obtain received symbols. A MIMO detector 256 may obtain received symbols from all the demodulators in transceivers 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH)) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the modulators (MODs) in transceivers 254a-254r (e.g., for single-carrier frequency division multiplexing (SC-FDM), etc.), and transmitted to the BS 110a. At the BS 110a, the uplink signals from the UE 120a may be received by the antennas 234, processed by the demodulators in transceivers 232a-232t, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

Antennas 252, processors 266, 258, 264, and/or controller/processor 280 of the UE 120a and/or antennas 234, processors 220, 230, 238, and/or controller/processor 240 of the BS 110a may be used to perform the various techniques and methods described herein. As shown in FIG. 2, the controller/processor 280 of the UE 120a has an RF exposure manager 281 that is representative of the RF exposure manager 122, according to aspects described herein. Although shown at the controller/processor, other components of the UE 120a and BS 110a may be used to perform the operations described herein.

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The system bandwidth may also be partitioned into subbands. For example, a subband may cover multiple resource blocks (RBs).

While the UE 120a is described with respect to FIGS. 1 and 2 as communicating with a BS and/or within a network, the UE 120a may be configured to communicate directly with/transmit directly to another UE 120, or with/to another wireless device without relaying communications through a network. In some aspects, the BS 110a illustrated in FIG. 2 and described above is an example of another UE 120.

Example RF Transceiver

Figure 3:
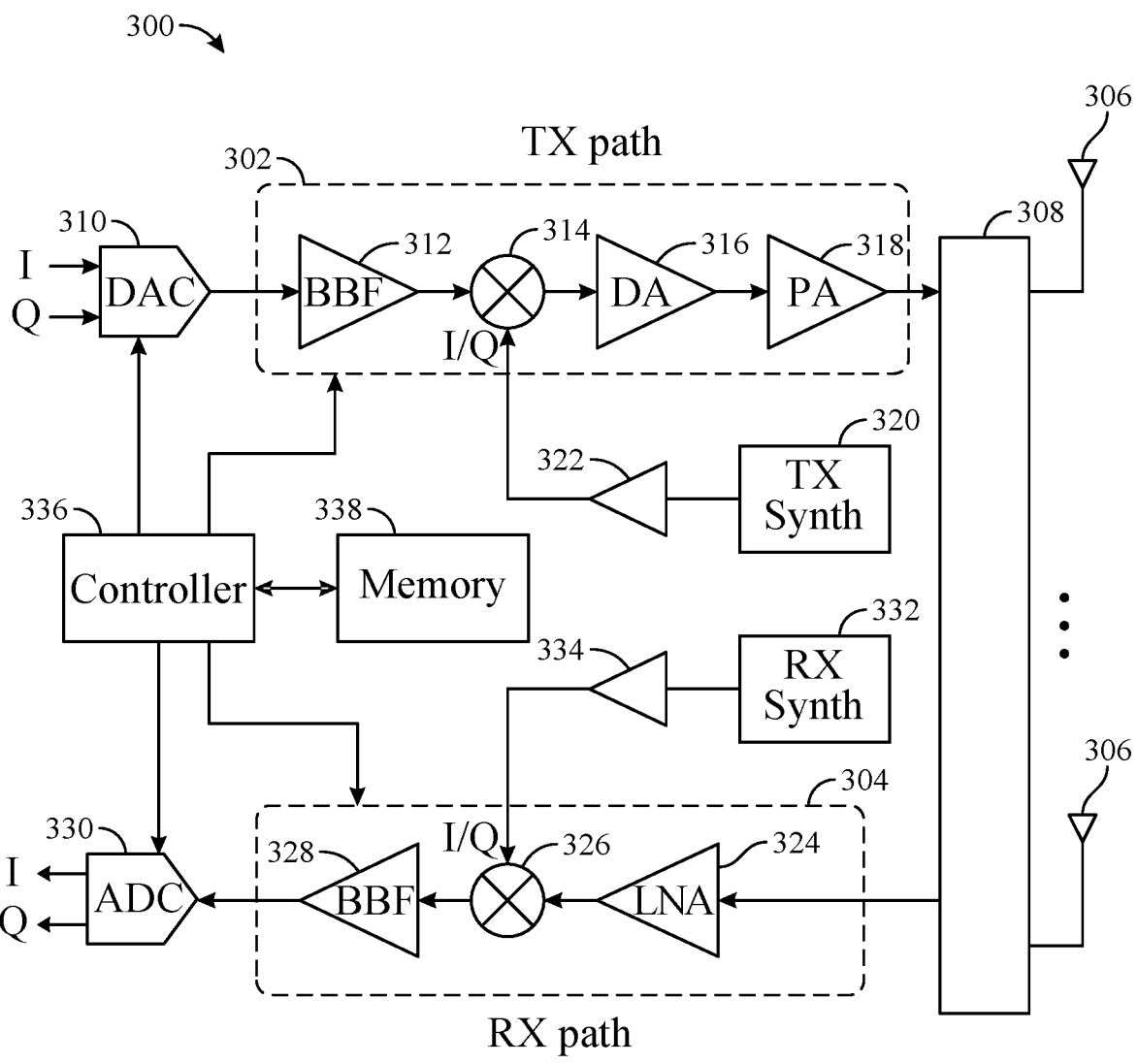
FIG. 3 is a block diagram of an example radio frequency (RF) transceiver.

FIG. 3 is a block diagram of an example RF transceiver circuit 300, in accordance with certain aspects of the present disclosure. The RF transceiver circuit 300 includes at least one transmit (TX) path 302 (also known as a transmit chain) for transmitting signals via one or more antennas 306 and at least one receive (RX) path 304 (also known as a receive chain) for receiving signals via the antennas 306. When the TX path 302 and the RX path 304 share an antenna 306, the paths may be connected with the antenna via an interface 308, which may include any of various suitable RF devices, such as a switch, a duplexer, a diplexer, a multiplexer, and the like.

Receiving in-phase (I) or quadrature (Q) baseband analog signals from a digital-to-analog converter (DAC) 310, the TX path 302 may include a baseband filter (BBF) 312, a mixer 314, a driver amplifier (DA) 316, and a power amplifier (PA) 318. The BBF 312, the mixer 314, and the DA 316 may be included in one or more radio frequency integrated circuits (RFICs). The PA 318 may be external to the RFIC(s) for some implementations.

The BBF 312 filters the baseband signals received from the DAC 310, and the mixer 314 mixes the filtered baseband signals with a transmit local oscillator (LO) signal to convert the baseband signal of interest to a different frequency (e.g., upconvert from baseband to a radio frequency). This frequency conversion process produces the sum and difference frequencies between the LO frequency and the frequencies of the baseband signal of interest. The sum and difference frequencies are referred to as the beat frequencies. The beat frequencies are typically in the RF range, such that the signals output by the mixer 314 are typically RF signals, which may be amplified by the DA 316 and/or by the PA 318 before transmission by the antenna 306. While one mixer 314 is illustrated, several mixers may be used to upconvert the filtered baseband signals to one or more intermediate frequencies and to thereafter upconvert the intermediate frequency signals to a frequency for transmission.

The RX path 304 may include a low noise amplifier (LNA) 324, a mixer 326, and a baseband filter (BBF) 328. The LNA 324, the mixer 326, and the BBF 328 may be included in one or more RFICs, which may or may not be the same RFIC that includes the TX path components. RF signals received via the antenna 306 may be amplified by the LNA 324, and the mixer 326 mixes the amplified RF signals with a receive local oscillator (LO) signal to convert the RF signal of interest to a different baseband frequency (e.g., downconvert). The baseband signals output by the mixer 326 may be filtered by the BBF 328 before being converted by an analog-to-digital converter (ADC) 330 to digital I or Q signals for digital signal processing.

Certain transceivers may employ frequency synthesizers with a voltage-controlled oscillator (VCO) to generate a stable, tunable LO with a particular tuning range. Thus, the transmit LO may be produced by a TX frequency synthesizer 320, which may be buffered or amplified by amplifier 322 before being mixed with the baseband signals in the mixer 314. Similarly, the receive LO may be produced by an RX frequency synthesizer 332, which may be buffered or amplified by amplifier 334 before being mixed with the RF signals in the mixer 326.

A controller 336 may direct the operation of the RF transceiver circuit 300, such as transmitting signals via the TX path 302 and/or receiving signals via the RX path 304. The controller 336 may be a processor, a digital signal processor (DSP), an application specific integrated circuit (ASIC), a field programmable gate array (FPGA) or other programmable logic device (PLD), discrete gate or transistor logic, discrete hardware components, or any combination thereof. The memory 338 may store data and program codes for operating the RF transceiver circuit 300. The controller 336 and/or memory 338 may include control logic. In certain cases, the controller 336 may determine a transmit power applied to the TX path 302 (e.g., certain levels of gain applied to the BBF 312, the DA 316, and/or the PA 318) that complies with an RF exposure limit set by country-specific regulations and/or international standards as further described herein.

Example RF Exposure Compliance

RF exposure may be expressed in terms of a specific absorption rate (SAR), which measures energy absorption by human tissue per unit mass and may have units of watts per kilogram (W/kg). RF exposure may also be expressed in terms of power density (PD), which measures energy absorption per unit area and may have units of milliwatts per square centimeter (mW/cm$^2$). In certain cases, a maximum permissible exposure (MPE) limit in terms of PD may be imposed for wireless devices using transmission frequencies above 6 GHz. The MPE limit is a regulatory metric for exposure based on area, e.g., an energy density limit defined as a number, X, watts per square meter (W/m$^2$) averaged over a defined area and averaged over a frequency-dependent time window in order to prevent a human exposure hazard represented by a tissue temperature change.

SAR may be used to assess RF exposure for transmission frequencies less than 6 GHz, which cover wireless communication technologies such as 2G/3G (e.g., CDMA), 4G (e.g., LTE), 5G (e.g., NR in 6 GHz bands), IEEE 802.11ac, etc. PD may be used to assess RF exposure for transmission frequencies higher than 6 GHz, which cover wireless communication technologies such as IEEE 802.11ad, 802.11ay, 5G in mmWave bands, etc. Thus, different metrics may be used to assess RF exposure for different wireless communication technologies.

A wireless device (e.g., UE 120) may simultaneously transmit signals using multiple wireless communication technologies. For example, the wireless device may simultaneously transmit signals using a first wireless communication technology operating at or below 6 GHz (e.g., 3G, 4G, 5G, etc.) and a second wireless communication technology operating above 6 GHz (e.g., mmWave 5G in 24 to 60 GHz bands, IEEE 802.11ad or 802.11ay). In certain aspects, the wireless device may simultaneously transmit signals using the first wireless communication technology (e.g., 3G, 4G, 5G in sub-6 GHz bands, IEEE 802.11ac, etc.) in which RF exposure is measured in terms of SAR, and the second wireless communication technology (e.g., 5G in 24 to 60 GHz bands, IEEE 802.11ad, 802.11ay, etc.) in which RF exposure is measured in terms of PD. As used herein, sub-6 GHz bands may include frequency bands of 300 MHz to 6,000 MHz in some examples, and may include bands in the 6,000 MHz and/or 7,000 MHz range in some examples.

In certain cases, compliance with an RF exposure limit may be performed as a time-averaged RF exposure evaluation within a specified time window (T) (e.g., 2 seconds for mmWave or 60 GHz bands, 100 or 360 seconds for bands ≤6 GHz, etc.) associated with the RF exposure limit.

Figures 4A, 4B, 4C:
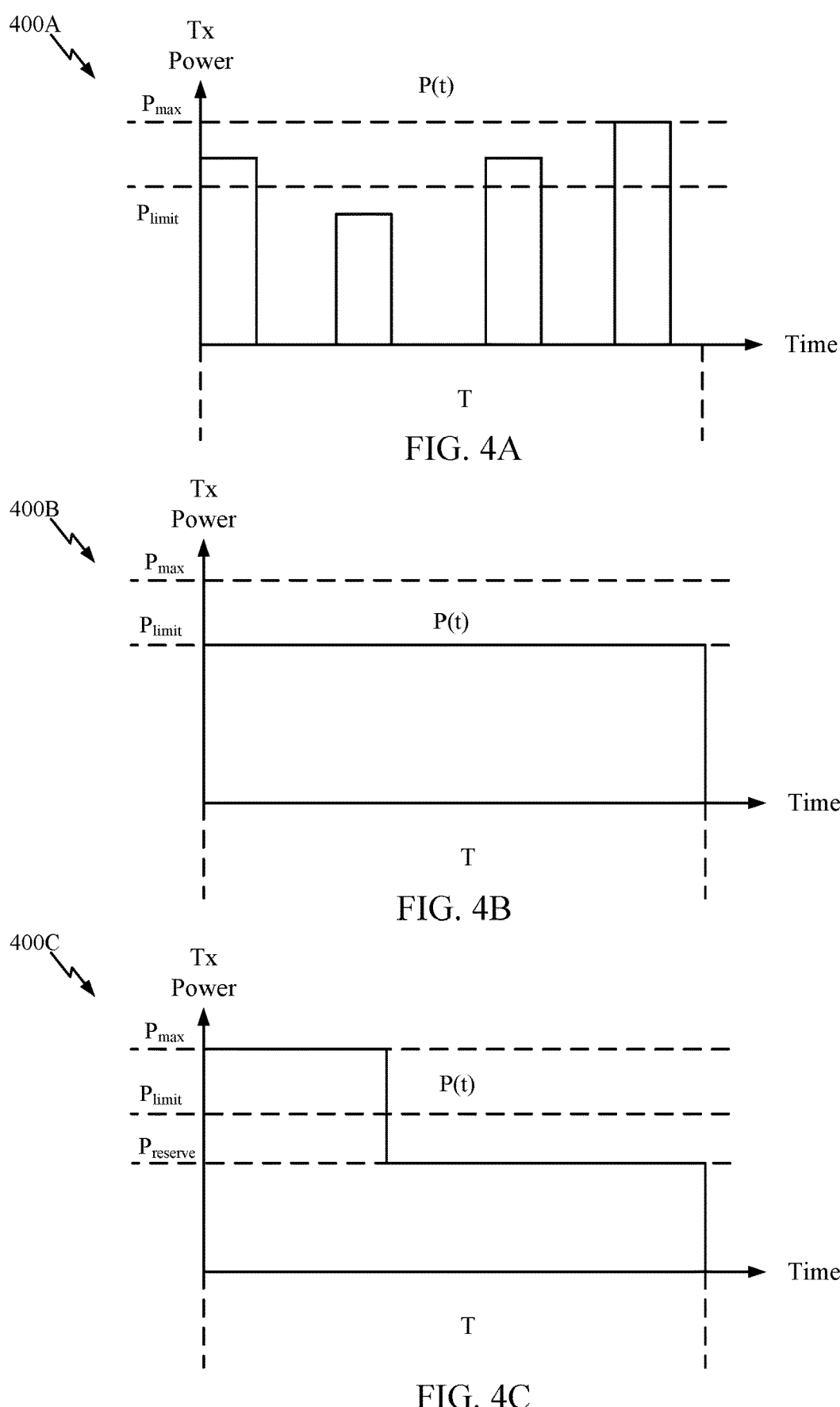
FIGS. 4A, 4B, and 4C are graphs illustrating examples of transmit powers over time in compliance with a time-averaged RF exposure limit.

FIG. 4A is a graph 400A of a transmit power over time (P(t)) that varies over a time window (T) associated with the RF exposure limit, in accordance with certain aspects of the present disclosure. As an example, the instantaneous transmit power may exceed a maximum time-averaged transmit power level $P_{limit}$ in certain transmission occasions in the time window (T). That is, the transmit power may be greater than the maximum time-averaged transmit power level $P_{limit}$. In certain cases, the UE may transmit at $P_{max}$, which is the maximum transmit power supported by the UE. In certain cases, the UE may transmit at a transmit power less than or equal to the maximum time-averaged transmit power level $P_{limit}$ in certain transmission occasions. The maximum time-averaged transmit power level $P_{limit}$ represents the time-averaged threshold in terms of transmit power for the RF exposure limit over the time window (T), and in certain cases, $P_{limit}$ may be referred to as the maximum time-averaged power level or limit, or in terms of exposure, the maximum time-averaged RF exposure level or limit. The graph 400A also illustrates gaps between transmission bursts, where the gaps represent periods during which no transmission was output from the device.

In certain cases, the transmit power may be maintained at the maximum time-averaged transmit power level (e.g., $P_{limit}$) allowed for RF exposure compliance that enables continuous transmission during the time window. For example, FIG. 4B is a graph 400B of a transmit power over time (P(t)) illustrating an example where the transmit power is limited to $P_{limit}$, in accordance with certain aspects of the present disclosure. As shown, the UE can transmit continuously at $P_{limit}$ in compliance with the RF exposure limit.

FIG. 4C is a graph 400C of a transmit power over time (P(t)) illustrating a time-averaged mode that provides a reserve power to enable a continuous transmission within the time window (T), in accordance with certain aspects of the present disclosure. As shown, the transmit power may be backed off from the maximum instantaneous power ($P_{max}$) to a reserve power ($P_{reserve}$) so that the UE can continue transmitting at the lower power ($P_{reserve}$) to maintain a continuous transmission during the time window (e.g., maintain a radio connection with a receiving entity). In FIG. 4C, the area of transmit power (P(t)) is equal to the area below $P_{limit}$ (as shown in FIG. 4B) for the time window T. Such an area may be considered using 100% of the energy (transmit power or exposure) to remain compliant with the time-averaged RF exposure limit. Without the reserve power $P_{reserve}$, the transmitter may transmit at $P_{max}$ for a portion of the time window with the transmitter turned off for the remainder of the time window to ensure compliance with the time-averaged RF exposure limit. In some aspects, $P_{reserve}$ is set at a fixed power used to serve for a purpose (e.g., reserving power for certain communications). If $P_{reserve}$ is half of $P_{limit}$ in FIG. 4C, then the area between $P_{max}$ and $P_{reserve}$ for the time duration of $P_{max}$ may be equal to the area between $P_{limit}$ and $P_{reserve}$ for the time window. The transmit duration at $P_{max}$ may be referred to as the burst transmit time (or high power duration). When more margin is available in the future (after T seconds), the transmitter may be allowed to transmit at a higher power again (e.g., in short bursts at $P_{max}$).

In some aspects, the UE may transmit at a power that is higher than the average power level, but less than $P_{max}$ in the time-averaged mode illustrated in FIG. 4C. While a single transmit burst is illustrated in FIG. 4C, it will be understood that the UE may instead utilize a plurality of transmit bursts within the time window (T), for example, as described herein with respect to FIG. 4A, where the transmit bursts may be separated by periods during which the transmit power is maintained at or below $P_{reserve}$. Further, it will be understood that the transmit power of each transmit burst may vary (either within the burst and/or in comparison to other bursts), and that at least a portion of the burst may be transmitted at a power above the maximum average power level (e.g., $P_{limit}$).

While FIGS. 4A-4C illustrate continuous transmission over a window, occasion, burst, etc., it will be understood that a duty cycle for transmission may be implemented. In such implementations, a transmit power may be zero periodically and maintained at a higher level (e.g., a level as illustrated in FIGS. 4A-4C) during other portions of the duty cycle. As used herein, the duty cycle of the transmission may refer to a portion (e.g., 5 ms) of a specific period (e.g., 500 ms) in which one or more signals are transmitted. In certain cases, the duty cycle may be standardized (e.g., predetermined) with a specific RAT and/or vary over time, for example, due to changes in radio conditions, mobility, and/or user behavior.

In certain cases, the RF exposure of a wireless device may be certified with a regulatory agency (e.g., Federal Communications Commission (FCC)). Spatial measurements may be taken with respect to a model (phantom) representing the human body, where the model may be filled with a liquid simulating human tissue. As discussed above, the UE 120 may simultaneously transmit signals using the first technology (e.g., 3G, 4G, IEEE 802.11ac, etc.) and the second technology (e.g., 5G, IEEE 802.11ad, etc.), in which RF exposure is measured using different metrics for the first technology and the second technology (e.g., SAR for the first technology and PD for the second technology). The RF exposure measurements may be performed differently for each transmit scenario and include, for example, electric field measurements using a model of a human body. RF exposure distributions (simulation and/or measurement) may then be generated per transmit antenna/configuration (beam) on all (or some) evaluation surfaces/positions of the wireless device at all (or some) locations of the human body model.

Certain regulations and/or standards for RF exposure compliance may allow for some exceptions to measuring the RF exposure. For example, the RF exposure for some surfaces of the wireless device may not be measured if certain exclusion criterion or criteria are satisfied. The FCC allows that SAR measurements can be avoided if the transmitting antenna inside the wireless device is located at more than 25 millimeters (mm) away from the evaluation surface. For example, a SAR measurement at the top surface of the wireless device may not be obtained when the antenna is located at the bottom surface of the wireless device. For surfaces that meet the exclusion criteria, the wireless device may use a default value for the RF exposure, such as 0.4 W/kg averaged over one gram of mass can be assumed on that surface.

In some cases, the RF exposure distributions associated with a wireless device may provide RF exposure (e.g., SAR) measurements across various surfaces of the wireless device. For example, for a specific transmission scenario (e.g., a specific radio access technology, band, antenna, and/or exposure scenario), the measured 1 gSAR values may be equal to [0.51, 0.41, 1.05, 0.23, XX, 0.71] for respective front, back, left, right, top, and bottom surfaces, where XX represents a surface from which no RF exposure measurements were taken, for example, due to certain exceptions in the certification process. For another transmission scenario (e.g., a different radio access technology, band, antenna, and/or exposure scenario), the measured 1 gSAR values may be equal to [0.42, 0.63, 0.21, 1.09, XX, 0.67] for the respective surfaces. The maximum time-averaged transmit power level $P_{limit}$ for each transmission scenario is determined based on the highest 1 gSAR values out of all surfaces. In this example, the highest 1 gSAR values may be 1.05 W/kg for the first transmission scenario and 1.09 W/kg for the second transmission scenario. The maximum time-averaged transmit power level $P_{limit}$ may be determined as follows:

$$P_{limit}(\text{mW}) = \frac{\text{highest 1g } SAR \text{ value}}{SAR \text{ design target}} * (\text{transmit power level})$$

where the highest 1 gSAR value may be 1.05 W/kg or 1.09 W/kg, in this example; the transmit power level is the measured transmit power taken during the SAR measurement; and the SAR design target may be a factor to adjust the $P_{limit}$ value to satisfy an RF exposure limit. The $P_{limit}$ transmit power level corresponds to an RF exposure level given by the SAR design target. The SAR design target may be less than or equal to the RF exposure limit.

To evaluate time-averaged RF exposure compliance when the wireless device is simultaneously transmitting under such transmission scenarios, the wireless device may use the maximum time-averaged transmit power level $P_{limit}$ for the respective transmission scenarios despite the normalized exposures being associated with different surfaces of the wireless device. Simultaneous transmissions may refer to the wireless device transmitting via multiple radios and/or antennas (or antenna arrays) in the same time interval associated with a time window of a time-averaged RF exposure limit. The wireless device may track the past RF exposure for a given time interval (e.g., 0.5 seconds) according to the following expression:

$$\text{Total } Norm \text{ Exposure} = \frac{Tx \text{ Power}_{ant1}}{P_{limit_{ant1}}} + \frac{Tx \text{ Power}_{ant2}}{P_{limit_{ant2}}}$$

where TotalNormExposure is the total normalized exposure exhibited by two antennas, in this example; TxPower$_{ant1}$ and $P_{limit_{ant1}}$ are the past transmit power for a given time interval (e.g., 0.5 seconds) and maximum time-averaged transmit power associated with a first antenna; and TxPower$_{ant2}$ and $P_{limit_{ant2}}$ are the past transmit power for the time interval and maximum time-averaged transmit power associated with a second antenna. In this example, the wireless device uses the worst-case exposure associated with each of the transmission scenarios even though the worst-case exposures are exhibited from different surfaces of the wireless device (e.g., left surface for ant1 and right surface for ant2). In certain cases, the wireless device may not use the normalized exposure values for the other surfaces such that the wireless device is only aware of the worst-case exposures for evaluating time-averaged RF exposure compliance.

Example RF Exposure Evaluation Per Surface

Multi-mode/multi-band UEs have multiple transmit antennas, which can simultaneously transmit in sub-6 GHz bands and bands greater than 6 GHz bands, such as mmWave bands. As described herein, the RF exposure of sub-6 GHz bands may be evaluated in terms of SAR, and the RF exposure of bands greater than 6 GHz may be evaluated in terms of PD. Due to the regulations on simultaneous exposure, the wireless device may limit maximum transmit power for both sub-6 GHz bands and bands greater than 6 GHz. The equivalent term for SAR design target terminology described above in the case of PD evaluation is PD design target, and in general can be referred to as RF exposure design target, where the RF exposure can represent both SAR or PD or any other RF exposure metric required by regulations and/or standards. The $P_{limit}$ transmit power level may correspond to an RF exposure level given by the RF exposure design target. The RF exposure design target may be less than or equal to the RF exposure limit. The RF exposure design target is typically selected to be less than the RF exposure limit for one or more reasons, such as to account for device uncertainty, to meet the RF exposure limit in exposure scenarios that involve transmitting simultaneously with other radios within the same device that have a different RF exposure controlling schemes, to have lower RF exposure for the device, etc.

Aspects of the present disclosure provide apparatus and methods for evaluating RF exposure per surface of a wireless device. The total time-averaged RF exposure of multiple radios may be evaluated per exposure surface of the wireless device. For time-averaged RF exposure compliance, the wireless device may use an RF exposure manager (e.g., RF exposure manager 122, RF exposure manager 281, etc.) to track historical RF exposure from multiple radios per surface of the wireless device. The wireless device may use the RF exposure manager to determine the maximum allowable transmit power for a future time interval based on the RF exposure evaluated per surface. For example, the wireless device may select the smallest value for the transmit power among the values determined for each surface.

The apparatus and methods for evaluating RF exposure per surface described herein may facilitate improved wireless communication performance (e.g., improved signal quality at the receiver, lower latencies, higher throughput, etc.). For example, the RF exposure evaluation per surface may provide an accurate assessment of the RF exposure occurring at particular surfaces across the wireless device allowing the wireless device to assign more exposure margin to certain transmissions.

Figure 5:
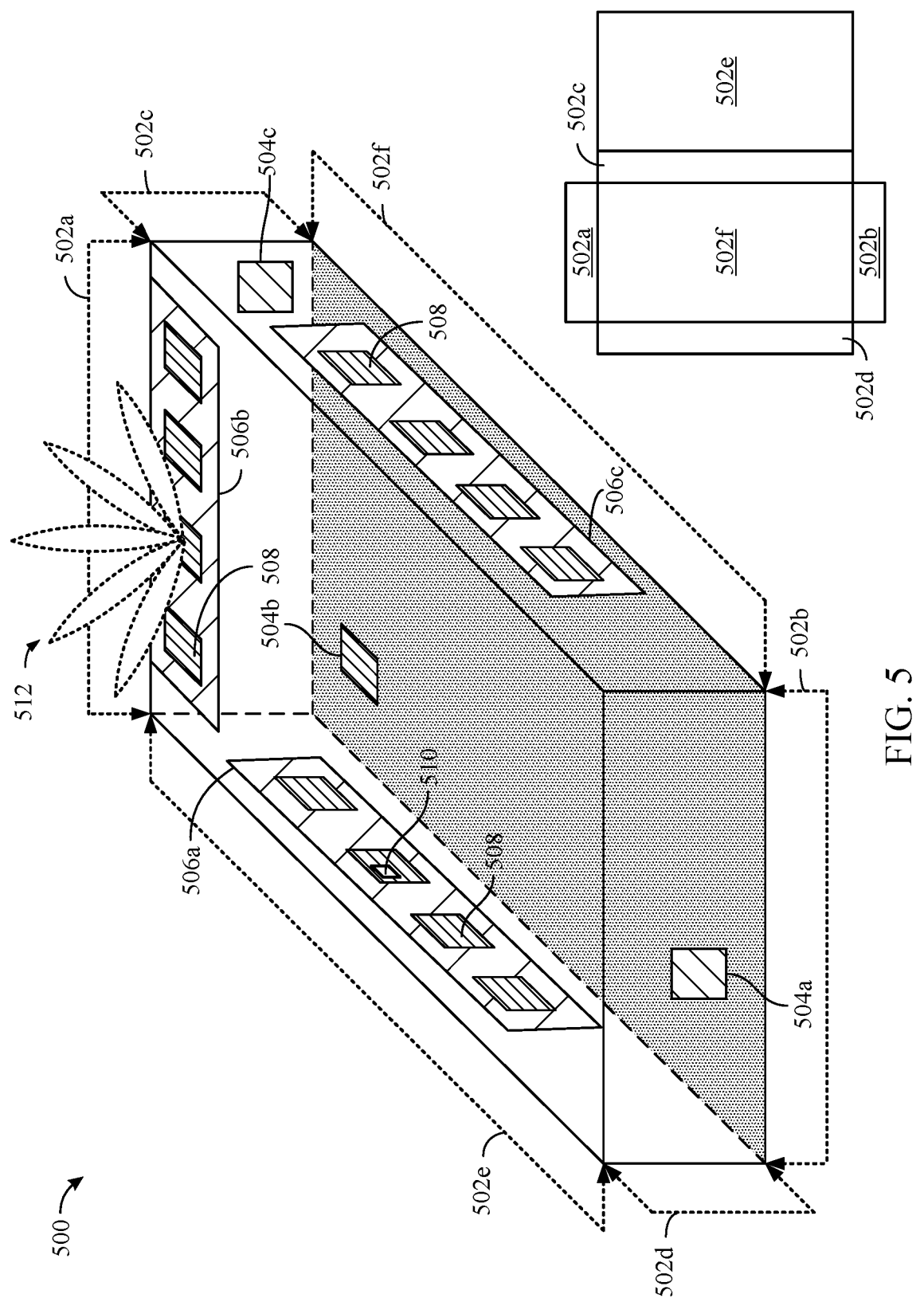
FIG. 5 illustrates an isometric view of multiple antennas arranged in various locations of a wireless device.

FIG. 5 illustrates an isometric view of multiple antennas arranged in various locations of a wireless device 500 (e.g., the UE 120). As shown, the wireless device 500 may have six surfaces 502a-f including a top surface 502a, a bottom surface 502b, a right surface 502c, a left surface 502d, a front surface 502e, and a back surface 502f. The wireless device may have multiple antennas including a first antenna 504a, a second antenna 504b, and a third antenna 504c. The wireless device may also have multiple antenna arrays including a first antenna array 506a, a second antenna array 506b, and a third antenna array 506c. Each of the antennas and antenna arrays is positioned at a different location on the wireless device. Each of the antenna arrays 506a-c may include one or more antenna arrays 508, which may include one or more antenna array elements 510. In certain aspects, the antennas 504a-c may be used for sub-6 GHz communications, and the antenna arrays 506a-c may be used for mmWave communications. In some examples, one or more of the antenna arrays 506 may be packaged into a module including the respective array and potentially other components such as a transceiver chip.

In aspects, each of the antenna arrays 506a-c may enable beamformed signals to be transmitted and/or received by the wireless device 500. For example, the second antenna array 506b may transmit signals via beams 512, where each of the beams 512 may be representative of a particular azimuth and/or elevation associated with an angle-of-departure (AoD).

In certain aspects, an RF exposure scenario (e.g., head exposure, body-worn exposure, extremity exposure, and/or hotspot exposure) may exhibit exposure from certain surfaces of the wireless device in certain positions. A particular exposure scenario may correspond to a device state index (DSI). For example, a head exposure scenario may exhibit exposure from the front surface of the wireless device in various positions including a left cheek position (e.g., when the wireless device is held against the left cheek of the user), left tilt position (e.g., when the wireless device is held at a tilted position relative to the left cheek of the user), right cheek position, and right tilt. The body-worn exposure scenario (e.g., when the wireless device is located in the pocket of a user's clothing) may exhibit exposure from a front surface or a back surface of the wireless device. The extremity exposure scenario (e.g., when the wireless device is held in the user's hand or located in an armband) may exhibit exposure from a front surface, a back surface, a left surface, a right surface, a top surface, and/or a bottom surface of the wireless device. The hotspot exposure scenario (e.g., when the wireless device is not proximate to human tissue) may exhibit exposure from a front surface, a back surface, a left surface, a right surface, a top surface, and/or a bottom surface. SAR and/or PD may be evaluated from all or some of the surfaces of the wireless device (e.g., front, back, left, right, top, and/or bottom).

For time-averaged RF exposure compliance, the wireless device may determine the allowed transmit power for a future time interval based on the total normalized exposure in past time intervals of a time window. In certain aspects, the wireless device may use a normalized exposure ratio for each of its surfaces, such as a normalized SAR and/or PD ratio for each of a front surface, back surface, left surface, right surface, top surface, and/or bottom surface. The normalized exposure ratios may be determined as follows:

$$\text{Normalized SAR ratios} = [\text{front SAR, back SAR, left SAR, right SAR, top SAR, bottom SAR}]/(\text{max surface SAR}) \quad (1)$$

where the max surface SAR is the greatest SAR value among the values of the surfaces for a given transmission scenario. Here, the RF exposure (SAR or PD) evaluated on each surface in Expression (1) may correspond to a same transmit power for a given antenna or same transmit power configuration for a given antenna array.

For example, for a first transmission scenario (e.g., a specific radio access technology, band, antenna, and/or exposure scenario), the wireless device may have the following normalized exposure ratios for the front, back, left, right, top, and bottom surfaces, respectively:

$$[0.51, 0.41, 1.05, 0.23, 0.4, 0.71]/1.05=[0.49, 0.39, 1.0, 0.22, 0.38, 0.68].$$

For a second transmission scenario (e.g., a different radio access technology, band, antenna, and/or exposure scenario), the wireless device may have the following normalized exposure ratios for the respective surfaces:

$$[0.42, 0.63, 0.21, 1.09, 0.4, 0.67]/1.09=[0.36, 0.58, 0.19, 1.0, 0.37, 0.62].$$

The wireless device may determine the total normalized exposure per surface for a given time interval (e.g., 0.5 s) as follows:

$$\text{Total } \textit{Norm} \text{ Exposure} = \tag{2}$$
$$\frac{Tx \, \text{Power}_{ant1}}{P_{limit_{ant1}}} [0.49, 0.39, 1.0, 0.22, 0.38, 0.68] +$$
$$\frac{Tx \, \text{Power}_{ant2}}{P_{limit_{ant2}}} [0.36, 0.58, 0.19, 1.0, 0.37, 0.62]$$

The wireless device may perform vector calculations on the array of normalized exposure ratios. The product of the normalized transmit power and the normalized exposure ratios may be calculated by applying the normalized transmit power to each of the normalized exposure ratios and yielding normalized exposure values for each of the surfaces. The sum of the normalized exposure values for the transmission scenarios may be calculated as a vector sum yielding a total normalized exposure value for each of the surfaces.

In certain aspects, the wireless device may use a time-averaged maximum transmit power limit ($P_{limit}$) per surface to evaluate the time-averaged RF exposure compliance. For example, the Plimit per surface may be determined as follows:

$$P_{limit\_surface}=Plimit/[\text{front SAR ratio, back SAR ratio, left SAR ratio, right SAR ratio, top SAR ratio, bottom SAR ratio}].$$

For example, for a first transmission scenario (e.g., a specific radio access technology, band, antenna, and/or exposure scenario), the wireless device may have the following $P_{limit}$ for the front, back, left, right, top, and bottom surfaces, respectively:

$$79.4 \, \text{mW}/([0.49, 0.39, 1.0, 0.22, 0.38, 0.68])=[162, 204, 80, 361, 209, 117].$$

For a second transmission scenario (e.g., a different radio access technology, band, antenna, and/or exposure scenario), the wireless device may have the following Plimit for the respective surfaces:

$$74.1 \, \text{mW}/([0.36, 0.58, 0.19, 1.0, 0.37, 0.62])=[206, 128, 390, 75, 201, 120].$$

The wireless device may determine the total normalized exposure per surface for a given time interval (e.g., 0.5 s) as follows:

$$\text{Total } \textit{Norm} \text{ Exposure} = \tag{3}$$
$$\frac{Tx \, \text{Power}_{ant1}}{[162, 204, 80, 361, 209, 117]} + \frac{Tx \, \text{Power}_{ant2}}{[206, 128, 390, 75, 201, 120]}$$

The wireless device may perform a time-averaging operation per surface and evaluate allowed transmit power for all active radios for a future time interval per surface. The wireless device may select the lowest value for the allowed transmit power among the values for the surfaces and apply that value at the transceiver, such as the RF transceiver circuit 300.

In simultaneous transmission scenarios, the time-averaged RF exposure evaluation per surface may allow the wireless device to assign more exposure margin, which may translate to more transmit power and improved wireless performance, if the worst surfaces in terms of exposure are different for transmitting radios. The time-averaged RF exposure evaluation per surface may increase the computation performance as the number of computations increases proportional to the number of surfaces evaluated.

In certain aspects, the wireless device may evaluate the time-averaged RF exposure per surface for a subset of exposure scenarios. For example, the wireless device may use the worst-case exposure values for head exposure scenarios and evaluate the time-averaged RF exposure per surface for a hotspot exposure scenario.

For certain aspects, the wireless device may evaluate the time-averaged RF exposure per surface for a subset of surfaces associated with the wireless device. Evaluating the time-averaged RF exposure using a subset of surfaces may reduce the number of computations and improve the computational performance of the RF exposure evaluation. There may be certain aspects where fewer than all of the surfaces associated with the wireless device may be evaluated for time-averaged RF exposure per surface. The number of surfaces evaluated can be reduced to a subset of surfaces. For example, the four positions associated with the front surface for head exposure can be reduced to left and right positions of the wireless device, where the left normalized SAR ratio may be equal to the greatest value among the left cheek and left tilt positions (e.g., max(left cheek, left tilt)) and the right normalized SAR ratio may be equal to the greatest value among the left check and left tilt positions (e.g., max(right cheek, right tilt)).

The surfaces can be evaluated in subsets in other exposure scenarios as well. For example, in hotspot mode, instead of using six surfaces—front, back, left, right, top, bottom, the wireless device may evaluate three sets of surfaces, where the first set may include a front surface and a left surface, the second set may include the back surface and the bottom surface, and the third surface may include the right surface and the top surface. The wireless device may evaluate the first set as the greatest value among the front surface and left surface (e.g., set1=max{front exp. ratio, left exp. ratio}), the second set as the greatest value among the back surface and the bottom surface (e.g., set2=max{back exp. ratio, bottom exp. ratio}), and the third set as greatest value among the right surface and the top surface (e.g., set3=max{right exp. ratio, top exp. ratio}). The subset of surfaces can be formed by considering the antenna placement among the surfaces and the corresponding exposure scenario. For example, if the wireless device has some antennas clustered at front-left, back-bottom and at top-right positions, three subsets as discussed above may be used.

In situations where there is no exposure measurement for a particular surface, the normalized exposure ratio may be replaced by a default value, e.g., 1.0. For surfaces where exposure information is not available (e.g., not measured due to exclusion criteria), the wireless device may use a default value corresponding to a particular maximum RF exposure limit (e.g., 0.4 W/kg 1 gSAR value). For example, for body-worn exposure scenarios, the exposure measurements may be obtained for front and back surfaces and not obtained for left, right, top, and bottom surfaces due to the exclusion criteria described herein. In such a case, the wireless device may use a default value for the normalized exposure for the left, right, top, and bottom surfaces, where the default value may correspond to a maximum RF exposure limit (e.g., 0.4 W/kg per 1 g SAR value).

In certain aspects, the RF exposure information (e.g., normalized exposure ratio and/or $P_{limit}$) per surface may be stored per beam (e.g., antenna configuration) and/or per antenna array (e.g., the maximum exposure out of all beams supported by the antenna array). The wireless device may evaluate the time-averaged RF exposure per surface based on the beam and/or antenna array used for a particular transmission.

FIG. 6 illustrates an example table of normalized SAR ratios for specific surfaces and/or positions. In this example, the head exposure scenario may have two normalized SAR ratios for a left position and a right position of a front surface per transmission scenario (e.g., a combination of radio access technology, band, and antenna). The body-worn exposure scenario may have normalized SAR ratios for front, back, left, right, top, and bottom surfaces per transmission scenario (or certain transmission scenarios). It will be appreciated that the wireless device may have the normalized exposure ratios per surface stored for other transmission scenarios (e.g., combinations of radio access technology, band, DSI, surface, and/or antenna/antenna array). For example, for sub-6 GHz bands, the wireless device may have normalized SAR ratios per surface stored per antenna/DSI (e.g., the maximum normalized SAR ratio out of all radio access technologies/bands supported by that antenna), per radio access technology/DSI (e.g., the maximum normalized SAR ratio out of all antennas/bands supported in that radio access technology), per antenna group/DSI (e.g., the maximum normalized SAR ratio out of all radio access technologies/bands/antennas supported in that antenna group), or per any combination of radio access technology, band, antenna(s), antenna array, antenna group, DSI, and surface(s). That is, in general, storing normalized SAR ratios per radio access technology, band, antenna, DSI, and/or surface can include storing normalized SAR ratios (i) per radio access technology, antenna, DSI, and surface; (ii) per antenna, DSI, and surface; (iii) per group of antennas, DSI, and surface; (iv) per radio access technology, group of antennas, DSI, and group of surfaces; or (v) per any combination of radio access technology, band, antenna(s), antenna array, DSI, and surface(s).

For certain aspects, the time-averaged RF exposure may be evaluated at the antenna array level such that the wireless device may have exposure information per surface for certain antenna arrays. FIG. 7A illustrates an example table of normalized PD ratios for specific surfaces per antenna array (e.g., the antenna arrays 506a-c). In this example, there are normalized PD ratios for front, back, left, right, top, and bottom surfaces per antenna array among four antenna arrays. Here, the normalized PD ratios on a given surface for an antenna array may be determined as the maximum ratio on that surface out of all supported beams by that antenna array (i.e., maximum value along each column as illustrated in FIG. 7B).

In certain aspects, the time-averaged RF exposure may be evaluated at the beam level such that the wireless device may have exposure information per surface for certain beams. FIG. 7B illustrates an example table of normalized PD ratios for specific surfaces per beam (e.g., the beams 512) associated with one or more antenna arrays (e.g., the antenna arrays 506a-c). In this example, there are normalized PD ratios for front, back, left, right, top, and bottom surfaces per beam among three beams. The beams may be emitted from the same antenna array or different antenna arrays. Here, the RF exposure on a given surface may be evaluated for different transmission and/or RF exposure scenarios as described above. Similar to normalized SAR ratios, the normalized PD ratios may be stored for each supported beam or antenna array or mmW band or a DSI or a group of beams or group of antenna arrays or a group of mmW bands or a group of DSIs or any other combinations.

Those of skill in the art will understand that the parameters and values illustrated in FIGS. 5-7B are exemplary only. Other parameters or categories of parameters may be used in addition to or instead of those illustrated. For example, the wireless device may have RF exposure information (e.g., normalized exposure ratios and/or $P_{limit}$) per surface (and/or position) for other exposure scenarios such as a hotspot exposure scenario and/or extremity exposure scenario. The wireless device may have exposure information per surface for exposure scenario categories, such as a head exposure category (including head exposure scenario) and non-head exposure category (including body, extremity, and hotspot exposure scenarios).

While tables are illustrated in FIGS. 6, 7A, and 7B, such structures are not required. The information in these figures may be generated, stored, and/or accessed in any number of different ways. In some examples, data structures corresponding to the tables in FIGS. 6, 7A, and 7B are stored in the memory 282 and/or the memory 338 or one or more memories associated with controller/processor 280 and/or the controller 336.

Figure 8:
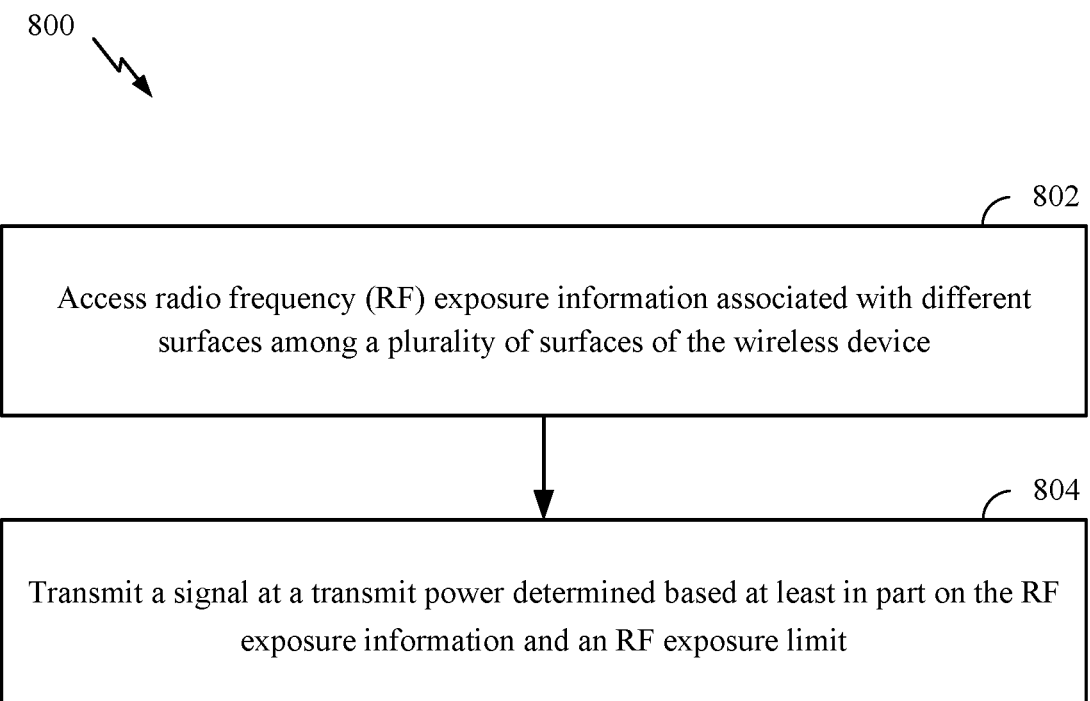
FIG. 8 is a flow diagram illustrating example operations for wireless communication by a wireless device, in accordance with certain aspects of the present disclosure.

FIG. 8 is a flow diagram illustrating example operations 800 for wireless communication, in accordance with certain aspects of the present disclosure. The operations 800 may be performed, for example, by a wireless device (e.g., the UE 120a in the wireless communication network 100). The operations 800 may be implemented as software components that are executed and run on one or more processors (e.g., controller/processor 280 of FIG. 2). For example, an RF exposure manager (e.g., RF exposure manager 122, RF exposure manager 281, etc.) implemented via the one or more processors may perform the operations 800 or a subset (e.g., block 802) thereof. Further, the transmission and/or reception of signals by the wireless device in the operations 800 may be enabled, for example, by one or more antennas (e.g., antennas 252 of FIG. 2). In certain aspects, the transmission and/or reception of signals by the wireless device may be implemented via a bus interface of one or more processors (e.g., controller/processor 280) obtaining and/or outputting signals.

The operations 800 may optionally begin, at block 802, where the wireless device may access RF exposure information (e.g., any of the tables depicted in FIG. 6, FIG. 7A, and FIG. 7B) associated with different surfaces among a plurality of surfaces (e.g., the surfaces 502a-f) of the wireless device. The wireless device may obtain the RF exposure information via memory. For example, the RF exposure information may be stored in memory (e.g., the memory 282 and/or the memory 338), and the wireless device may access the memory to obtain the RF exposure information.

The exposure information may include a plurality of exposure parameters associated with the different surfaces. For example, each of the parameters may be associated with a different surface among the surfaces. The parameters may include a normalized RF exposure ratio or a maximum time-averaged transmit power (e.g., $P_{limit}$) associated with different surfaces as described herein. In certain cases, at least one of the plurality of exposure parameters may be indicative of a normalized RF exposure ratio (e.g., a normalized SAR ratio or normalized PD ratio) associated with a particular surface among the plurality of surfaces, such as the normalized RF exposure ratios depicted in FIGS. 6, 7A, and 7B. In some cases, at least one of the plurality of exposure parameters may be indicative of a maximum time-averaged transmit power (e.g., $P_{limit}$) associated with a particular surface among the plurality of surfaces.

At block 804, the wireless device may transmit a signal at a transmit power determined based at least in part on the RF exposure information and an RF exposure limit. In certain cases, the wireless device may transmit via multiple antennas (and/or antenna arrays) simultaneously, where simultaneous transmissions may include transmissions in the same transmission occasion or time interval associated with the RF exposure limit. In some cases, the wireless device may transmit via multiple radios simultaneously. For example, the wireless device may transmit via any combination of a wireless wide area network (WWAN) radio (e.g., CDMA, E-UTRA, NR, etc.), wireless local area network (WLAN) radio (e.g., IEEE 802.11), and/or Bluetooth radio, and/or satellite, P2P, V2X communications, simultaneously. The wireless device may perform the time-averaged RF exposure evaluation per surface as described herein in response to the wireless device transmitting simultaneously via multiple antennas, antenna arrays, and/or radios.

In certain aspects, the exposure parameters may use a default value for the exposure information of a particular surface. At least one of the plurality of exposure parameters may have a default value. The default value may be equal to a normalized maximum RF exposure limit (e.g., 1.0). The default value may correspond to a maximum RF exposure limit averaged over a tissue mass (e.g., 0.4 W/kg per 1 g).

For certain aspects, the wireless device may use exposure information associated with certain exposure scenario(s), for example, in connection with FIG. 6. The exposure information may include sets of one or more exposure parameters associated with different exposure scenarios. As an example, the exposure information may include a first set of one or more exposure parameters and a second set of one or more exposure parameters, where the first set of one or more exposure parameters corresponds to a first exposure scenario (e.g., a head exposure scenario), and the second set of one or more exposure parameters corresponds to a second exposure scenario (e.g., a body exposure scenario) different from the first exposure scenario. In certain aspects, the first set of one or more exposure parameters may include two exposure parameters corresponding to a single surface (e.g., a front surface) of the wireless device in two different positions (a left cheek position and a right cheek position). The second set of one or more exposure parameters includes six exposure parameters corresponding to six surfaces (e.g., the surfaces 502a-f) of the wireless device. The first exposure scenario may correspond to a head exposure scenario. The second exposure scenario may correspond to a body exposure scenario, an extremity exposure scenario, a hotspot exposure scenario, or a combination thereof.

In certain aspects, the wireless device may use exposure information associated with a subset of the surfaces or all of the surfaces. In some cases, the exposure parameters may be associated with a subset of the surfaces. For example, a head exposure scenario may have normalized exposure ratios associated with a front surface of the wireless device in two different positions. The exposure parameters may be associated with all of the surfaces. For example, a body-worn exposure scenario may have normalized exposure ratios associated with the front, back, left, right, top, and bottom surfaces.

In certain aspects, the wireless device may have exposure information associated with certain transmission scenarios, such as one or more bands, one or more antennas, and/or one or more antenna arrays, for example, as described herein with respect to FIG. 6, FIG. 7A, and FIG. 7B. A transmission scenario may refer to a transmission event with one or more characteristics, such as the radio access technology, frequency band, antenna, antenna arrays, beam, exposure scenario, etc. The exposure information may include sets of one or more exposure parameters associated with different frequency bands, different antennas, different antenna arrays, different beams, or a combination thereof. The exposure information may include a first set of exposure parameters associated with a first frequency band of a radio access technology and a first antenna, and the exposure information may include a second set of exposure parameters associated with a second frequency band of the radio access technology and the first antenna. The first set of exposure parameters and the second set of exposure parameters may have values per surface of all or a subset of the surfaces of the wireless device.

For certain aspects, the wireless device may have exposure information associated with one or more beams (e.g., the beams 512), for example, as described herein with respect to FIG. 7B. The exposure information may include sets of one or more exposure parameters (e.g., normalized exposure ratios) associated with different beams among a plurality of beams associated with one or more antenna arrays of the wireless device. For example, the exposure information may include a first set of exposure parameters associated with a first beam and a second set of exposure parameters associated with a second beam, where the first set of exposure parameters and the second set of exposure parameters may have values per surface of all or a subset of the surfaces of the wireless device.

For certain aspects, the wireless device may use the exposure information associated with transmission scenarios (in past time intervals or a future time interval) to determine the transmit power of the signal. The wireless device may determine allowed transmit powers per surface among two or more of the surfaces of the wireless device using the exposure information based at least in part on the RF exposure limit. The wireless device may determine the total normalized exposure per surface among multiple surfaces in past time intervals associated with a time window of the RF exposure limit, for example, as described herein with respect to Expression (2). The wireless device may determine the allowed transmit powers per surface among multiple surface in a future time interval associated with the time window based on the total normalized exposure per surface associated with the past time intervals such that a time-averaged RF exposure limit is satisfied, for example, as described herein with respect to FIGS. 4A-C. To determine the allowed transmit powers, the wireless device may determine the allowed transmit powers in a future time interval such that a time-averaged value of the allowed transmit powers and past exposure (e.g., total normalized exposure per surface) over a time window satisfies a time-averaged RF exposure limit. The wireless device may select a smallest value among the allowed transmit powers. The wireless device may transmit the signal at the transmit power being less than or equal to the selected value.

While the examples depicted in FIGS. 1-8 are described herein with respect to a UE performing the various methods for providing RF exposure compliance to facilitate understanding, aspects of the present disclosure may also be applied to other wireless devices, such as a wireless station, an access point, a base station and/or a customer premises equipment (CPE), performing the RF exposure compliance described herein. Further, while the examples are described with respect to communications between the UE (or other wireless device) and a network entity, the UE or other wireless device may be communicating with a device other than a network entity, for example another UE or with another device in a user's home that is not a network entity, for example.

It will be appreciated that evaluating RF exposure per surface described herein may enable desirable wireless communication performance, such as reduced latencies, increased uplink data rates, and/or an uplink connection at the edge of a cell, for example, due to the increased exposure margin that can be assigned to transmissions.

Example Communications Device

Figure 9:
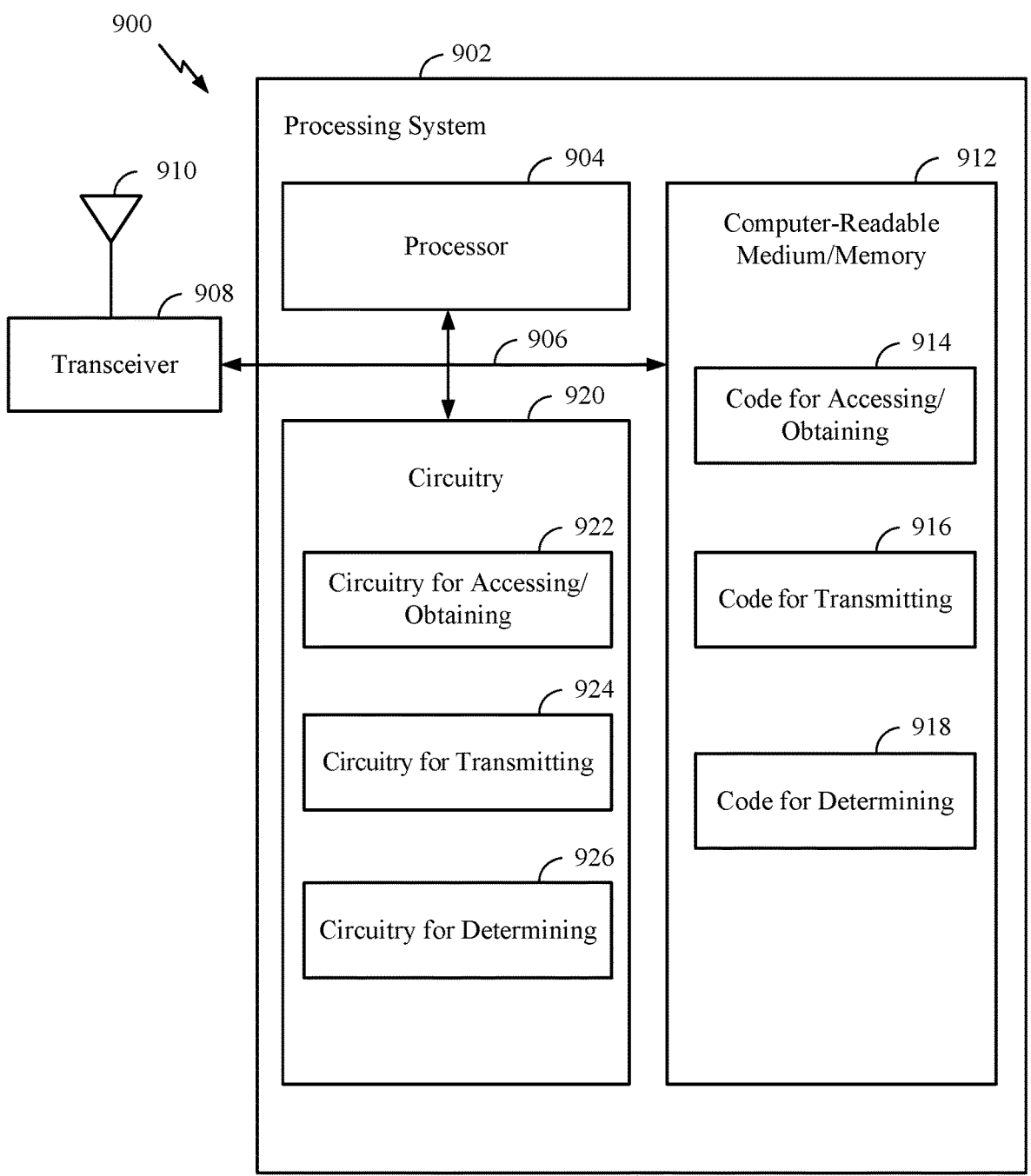
FIG. 9 illustrates a communications device (e.g., a UE) that may include various components configured to perform operations for the techniques disclosed herein, in accordance with certain aspects of the present disclosure.

FIG. 9 illustrates a communications device 900 (e.g., the UE 120) that may include various components (e.g., corresponding to means-plus-function components) configured to perform operations for the techniques disclosed herein, such as the operations illustrated in FIG. 8. The communications device 900 includes a processing system 902, which may be coupled to a transceiver 908 (e.g., a transmitter and/or a receiver). The transceiver 908 is configured to transmit and receive signals for the communications device 900 via an antenna 910, such as the various signals as described herein. The processing system 902 may be configured to perform processing functions for the communications device 900, including processing signals received and/or to be transmitted by the communications device 900.

The processing system 902 includes a processor 904 coupled to a computer-readable medium/memory 912 via a bus 906. In certain aspects, the computer-readable medium/memory 912 is configured to store instructions (e.g., computer-executable code) that when executed by the processor 904, cause the communications device 900 to perform the operations 800 illustrated in FIG. 8, or other operations for performing the various techniques discussed herein for providing RF exposure compliance. In certain aspects, computer-readable medium/memory 912 stores code for accessing (or obtaining) 914, code for transmitting (or outputting) 916, code for determining 918, or any combination thereof.

In certain aspects, the processing system 902 has circuitry 920 configured to implement the code stored in the computer-readable medium/memory 912. In certain aspects, the circuitry 920 is coupled to the processor 904 and/or the computer-readable medium/memory 912 via the bus 906. For example, the circuitry 920 includes circuitry for accessing (or obtaining) 922, circuitry for transmitting (or outputting) 924, circuitry for determining 926, or any combination thereof.

In some examples, means for transmitting or sending (or means for outputting for transmission) may include the transceivers 254 and/or antenna(s) 252 of the UE 120 illustrated in FIG. 2 and/or transceiver 908 and antenna 910 of the communications device 900 in FIG. 9.

In some cases, rather than actually transmitting, for example, signals and/or data, a device may have an interface to output signals and/or data for transmission (a means for outputting). For example, a processor may output signals and/or data, via a bus interface, to a radio frequency (RF) front end for transmission. Similarly, rather than actually receiving signals and/or data, a device may have an interface to obtain the signals and/or data received from another device (a means for obtaining). For example, a processor may obtain (or receive) the signals and/or data, via a bus interface, from an RF front end for reception. In various aspects, an RF front end may include various components, including transmit and receive processors, transmit and receive MIMO processors, modulators, demodulators, and the like, such as depicted in the examples in FIG. 2.

In some examples, means for accessing and/or means for determining may include various processing system components, such as: the processor 904 in FIG. 9, or aspects of the UE 120 depicted in FIG. 2, including receive processor 258, transmit processor 264, TX MIMO processor 266, and/or controller/processor 280.

Example Aspects

Implementation examples are described in the following numbered clauses:

Aspect 1: A method of wireless communication by a wireless device, comprising: accessing radio frequency (RF) exposure information associated with different surfaces among a plurality of surfaces of the wireless device; and transmitting a signal at a transmit power determined based at least in part on the RF exposure information and an RF exposure limit.

Aspect 2: The method of Aspect 1, wherein the exposure information includes a plurality of exposure parameters associated with the different surfaces.

Aspect 3: The method of Aspect 2, wherein at least one of the plurality of exposure parameters is indicative of a normalized RF exposure ratio associated with a particular surface among the plurality of surfaces.

Aspect 4: The method of Aspect 2 or 3, wherein at least one of the plurality of exposure parameters is indicative of a maximum time-averaged transmit power associated with a particular surface among the plurality of surfaces.

Aspect 5: The method according to any of Aspects 2-4, wherein at least one of the plurality of exposure parameters has a default value.

Aspect 6: The method of Aspect 5, wherein the default value is equal to a normalized maximum RF exposure limit.

Aspect 7: The method of Aspect 5, wherein the default value is equal to a normalized maximum RF exposure design target.

Aspect 8: The method according to any of Aspects 5-7, wherein the default value corresponds to a maximum RF exposure limit averaged over a tissue mass.

Aspect 9: The method according to any of Aspects 5-7, wherein the default value corresponds to a maximum RF exposure design target averaged over a tissue mass.

Aspect 10: The method according to any of Aspects 1-9, wherein the exposure information includes sets of one or more exposure parameters associated with different exposure scenarios.

Aspect 11: The method according to any of Aspects 1-10, wherein the exposure information includes sets of one or more exposure parameters associated with different transmission scenarios, wherein each transmission scenario defines one or more transmission technologies, one or more frequency bands, one or more antennas or one or more beams or one or more antenna arrays, a DSI and/or exposure scenario, or any combination thereof.

Aspect 12: The method according to any of Aspects 1-11, wherein: the exposure information includes a first set of one or more exposure parameters and a second set of one or more exposure parameters; the first set of one or more exposure parameters corresponds to a first exposure scenario; and the second set of one or more exposure parameters corresponds to a second exposure scenario different from the first exposure scenario.

Aspect 13: The method of Aspect 12, wherein: the first set of one or more exposure parameters includes two exposure parameters corresponding to a single surface of the wireless device in two different positions; and the second set of one or more exposure parameters includes six exposure parameters corresponding to six surfaces of the wireless device.

Aspect 14: The method of Aspect 13, wherein the first exposure scenario corresponds to a head exposure scenario.

Aspect 15: The method of Aspect 13 or 14, wherein the second exposure scenario corresponds to a hotspot exposure scenario or an extremity exposure scenario.

Aspect 16: The method according to any of Aspects 2-15, wherein the plurality of exposure parameters are associated with a subset of the surfaces.

Aspect 17: The method according to any of Aspects 2-16, wherein the plurality of exposure parameters are associated with all of the surfaces.

Aspect 18: The method according to any of Aspects 1-17, wherein the exposure information includes sets of one or more exposure parameters associated with different beams among a plurality of beams.

Aspect 19: The method according to any of Aspects 1-18, wherein the exposure information includes sets of one or more exposure parameters associated with different frequency bands, different antennas, or a combination thereof.

Aspect 20: The method according to any of Aspects 1-19, wherein the exposure information includes sets of one or more exposure parameters associated with different frequency bands, different antenna arrays, or a combination thereof.

Aspect 21: The method according to any of Aspects 1-20, wherein the RF exposure information includes sets of one or more exposure parameters associated with different frequency bands, different antennas, different antenna arrays, different radio access technologies, different surfaces of the wireless device, different positions of the wireless device, or a combination thereof.

Aspect 22: The method according to any of Aspects 1-21, further comprising: determining allowed transmit powers per surface among two or more of the surfaces of the wireless device using the exposure information based at least in part on the RF exposure limit; selecting a smallest value among the allowed transmit powers; and transmitting the signal at the transmit power being less than or equal to the selected value.

Aspect 23: The method of Aspect 22, wherein determining the allowed transmit powers comprises determining the allowed transmit powers in a future time interval such that a time-averaged value of the allowed transmit powers and past exposure over a time window satisfies the RF exposure limit.

Aspect 24: An apparatus for wireless communication, comprising: one or more memories collectively storing computer-executable instructions; and one or more processors coupled to the one or more memories, the one or more processors being collectively configured to execute the computer-executable instructions to cause the apparatus to perform an operation comprising: accessing radio frequency (RF) exposure information associated with different surfaces among a plurality of surfaces of the wireless device, and transmitting a signal at a transmit power determined based at least in part on the RF exposure information and an RF exposure limit.

Aspect 25: An apparatus for wireless communication, comprising: means for accessing radio frequency (RF) exposure information associated with different surfaces among a plurality of surfaces of the wireless device; and means for transmitting a signal at a transmit power determined based at least in part on the RF exposure information and an RF exposure limit.

Aspect 26: A computer-readable medium having instructions stored thereon for: accessing radio frequency (RF) exposure information associated with different surfaces among a plurality of surfaces of the wireless device; and transmitting a signal at a transmit power determined based at least in part on the RF exposure information and an RF exposure limit.

Aspect 27: An apparatus comprising: one or more memories collectively storing comprising computer-executable instructions; and one or more processors coupled to the one or more memories and being collectively configured to execute the computer-executable instructions to cause the apparatus to perform a method in accordance with any of Aspects 1-23.

Aspect 28: An apparatus comprising means for performing a method in accordance with any of Aspects 1-23.

Aspect 29: A non-transitory computer-readable medium comprising computer-executable instructions that, when executed by one or more processors of a processing system, cause the processing system to perform a method in accordance with any of Aspects 1-23.

Aspect 30: A computer program product embodied on a computer-readable storage medium comprising code for performing a method in accordance with any of Aspects 1-23.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g., 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a closed subscriber group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a customer premises equipment (CPE), a cellular phone, a smart phone, a personal digital assistant (PDA), a wireless modem, a wireless device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manu-facturing equipment, a global positioning system device, or any other suitable device that is configured to communicate via a wireless or wired medium. Some UEs may be consid-ered machine-type communication (MTC) devices or evolved MTC (eMTC) devices. MTC and eMTC UEs include, for example, robots, drones, remote devices, sen-sors, meters, monitors, location tags, etc., that may commu-nicate with a BS, another device (e.g., remote device), or some other entity. A wireless node may provide, for example, connectivity for or to a network (e.g., a wide area network such as Internet or a cellular network) via a wired or wireless communication link. Some UEs may be consid-ered Internet-of-Things (IoT) devices, which may be nar-rowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, recon-figuring, and releasing resources for one or more subordi-nate entities. That is, for scheduled communication, subor-dinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another with-out departing from the scope of the claims. In other words, unless a specific order of steps or actions is specified, the order and/or use of specific steps and/or actions may be modified without departing from the scope of the claims.

As used herein, "a processor," "at least one processor," or "one or more processors" generally refers to a single pro-cessor configured to perform one or multiple operations or multiple processors configured to collectively perform one or more operations. In the case of multiple processors, performance of the one or more operations could be divided amongst different processors, though one processor may perform multiple operations, and multiple processors could collectively perform a single operation. Similarly, "a memory," "at least one memory," or "one or more memo-ries" generally refers to a single memory configured to store data and/or instructions or multiple memories configured to collectively store data and/or instructions.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, gen-erating, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include vari-ous hardware and/or software component(s) and/or array(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the physical (PHY) layer. In the case of a UE (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer-readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read-Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 8.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, or a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

The invention claimed is:

1. A method of wireless communication by a wireless device, comprising:
   accessing radio frequency (RF) exposure information associated with different surfaces among a plurality of surfaces of the wireless device, wherein the RF exposure information includes a plurality of exposure parameters associated with the different surfaces; and
   transmitting a signal at a transmit power determined based at least in part on the RF exposure information and an RF exposure limit.

2. The method of claim 1, wherein at least one of the plurality of exposure parameters is indicative of a normalized RF exposure ratio associated with a particular surface among the plurality of surfaces.

3. The method of claim 1, wherein at least one of the plurality of exposure parameters is indicative of a maximum time-averaged transmit power associated with a particular surface among the plurality of surfaces.

4. The method of claim 1, wherein at least one of the plurality of exposure parameters has a default value.

5. The method of claim 4, wherein the default value is equal to a normalized maximum RF exposure design target.

6. The method of claim 1, wherein the RF exposure information includes sets of one or more exposure parameters associated with different exposure scenarios.

7. The method of claim 1, wherein:
   the RF exposure information includes a first set of one or more exposure parameters and a second set of one or more exposure parameters;
   the first set of one or more exposure parameters corresponds to a first exposure scenario; and
   the second set of one or more exposure parameters corresponds to a second exposure scenario different from the first exposure scenario.

8. The method of claim 7, wherein:
   the first set of one or more exposure parameters includes two exposure parameters corresponding to a single surface of the wireless device in two different positions; and
   the second set of one or more exposure parameters includes six exposure parameters corresponding to six surfaces of the wireless device.

9. The method of claim 8, wherein the first exposure scenario corresponds to a head exposure scenario.

10. The method of claim 8, wherein the second exposure scenario corresponds to a hotspot exposure scenario or an extremity exposure scenario.

11. The method of claim 1, wherein the plurality of exposure parameters are associated with a subset of the different surfaces.

12. The method of claim 1, wherein the plurality of exposure parameters are associated with all of the different surfaces.

13. The method of claim 1, wherein the RF exposure information includes sets of one or more exposure parameters associated with different beams among a plurality of beams.

14. The method of claim 1, wherein the RF exposure information includes sets of one or more exposure parameters associated with different frequency bands, different antennas, or a combination thereof.

15. The method of claim 1, wherein the RF exposure information includes sets of one or more exposure parameters associated with different frequency bands, different antenna arrays, or a combination thereof.

16. The method of claim 1, wherein the RF exposure information includes sets of one or more exposure parameters associated with different frequency bands, different antennas, different antenna arrays, different radio access technologies, different surfaces of the wireless device, different positions of the wireless device, or a combination thereof.

17. The method of claim 1, further comprising:
   determining allowed transmit powers per surface among two or more of the different surfaces of the wireless device using the RF exposure information based at least in part on the RF exposure limit;
   selecting a smallest value among the allowed transmit powers; and
   transmitting the signal at the transmit power being less than or equal to the selected value.

18. The method of claim 17, wherein determining the allowed transmit powers comprises determining the allowed transmit powers in a future time interval such that a time-averaged value of the allowed transmit powers and past exposure over a time window satisfies the RF exposure limit.

19. An apparatus for wireless communication, comprising:
   one or more memories collectively storing computer-executable instructions; and
   one or more processors coupled to the one or more memories, the one or more processors being collectively configured to execute the computer-executable instructions to cause the apparatus to perform an operation comprising:
      accessing radio frequency (RF) exposure information associated with different surfaces among a plurality of surfaces of the apparatus, wherein the RF exposure information includes a plurality of exposure parameters associated with the different surfaces; and
      transmitting a signal at a transmit power determined based at least in part on the RF exposure information and an RF exposure limit.

20. The apparatus of claim 19, wherein at least one of the plurality of exposure parameters is indicative of a normalized RF exposure ratio associated with a particular surface among the plurality of surfaces.

21. The apparatus of claim 19, wherein at least one of the plurality of exposure parameters is indicative of a maximum time-averaged transmit power associated with a particular surface among the plurality of surfaces.

22. The apparatus of claim 19, wherein at least one of the plurality of exposure parameters has a default value.

23. The apparatus of claim 22, wherein the default value is equal to a normalized maximum RF exposure design target.

24. The apparatus of claim 19, wherein the RF exposure information includes sets of one or more exposure parameters associated with different exposure scenarios.

25. The apparatus of claim 19, wherein:

the RF exposure information includes a first set of one or more exposure parameters and a second set of one or more exposure parameters;

the first set of one or more exposure parameters corresponds to a first exposure scenario; and the second set of one or more exposure parameters corresponds to a second exposure scenario different from the first exposure scenario.

26. The apparatus of claim 25, wherein:

the first set of one or more exposure parameters includes two exposure parameters corresponding to a single surface of the apparatus in two different positions; and the second set of one or more exposure parameters includes six exposure parameters corresponding to six surfaces of the apparatus.

27. An apparatus for wireless communication, comprising:

means for accessing radio frequency (RF) exposure information associated with different surfaces among a plurality of surfaces of the apparatus, wherein the RF exposure information includes a plurality of exposure parameters associated with the different surfaces; and means for transmitting a signal at a transmit power determined based at least in part on the RF exposure information and an RF exposure limit.

28. A non-transitory computer-readable medium having instructions stored thereon for:

accessing radio frequency (RF) exposure information associated with different surfaces among a plurality of surfaces of a wireless device, wherein the RF exposure information includes a plurality of exposure parameters associated with the different surfaces; and transmitting a signal at a transmit power determined based at least in part on the RF exposure information and an RF exposure limit.

29. The non-transitory computer-readable medium of claim 28, wherein at least one of the plurality of exposure parameters is indicative of a normalized RF exposure ratio associated with a particular surface among the plurality of surfaces.

30. The apparatus of claim 27, wherein at least one of the plurality of exposure parameters is indicative of a normalized RF exposure ratio associated with a particular surface among the plurality of surfaces.

* * * * *